United States Patent [19]

Morita et al.

[11] 4,331,640

[45] May 25, 1982

[54] PROCESS FOR REMOVING SULFUR DIOXIDE FROM AN EXHAUST GAS CONTAINING THE SAME

[75] Inventors: Tomijiro Morita; Masakazu Takaiwa; Toshiharu Matsuda, all of Iwaki, Japan

[73] Assignee: Kureha Kagaku Kogyo Kabushiki Kaisha, Tokyo, Japan

[21] Appl. No.: 47,083

[22] Filed: Jun. 11, 1979

[30] Foreign Application Priority Data

Jun. 26, 1978 [JP] Japan .................................. 53-77158
Jul. 24, 1978 [JP] Japan .................................. 53-90265

[51] Int. Cl.$^3$ ...................... C01B 17/00; C01B 17/45; C01B 17/46
[52] U.S. Cl. ................................. 423/242; 423/512 A
[58] Field of Search .......... 423/242 A, 242 R, 512 A, 423/244 R

[56] References Cited

U.S. PATENT DOCUMENTS 2,154,996  4/1939  Rawling ........................... 423/312 A
3,944,649  3/1976  Field et al. ........................... 423/242
3,989,796  11/1976 Morita et al. ............... 423/512 A X

FOREIGN PATENT DOCUMENTS 49-48599  5/1974  Japan ................................ 423/242 A

*Primary Examiner*—O. R. Vertiz
*Assistant Examiner*—Gregory A. Heller
*Attorney, Agent, or Firm*—Wegner & Bretschneider

[57] ABSTRACT

A method for preventing the accumulation of an alkali sulfate produced as a by-product in the system for removing sulfur dioxide from exhaust gases containing sulfur dioxide is disclosed, the system comprising bringing the exhaust gas into contact with an aqueous solution containing an alkali sulfite to absorb sulfur dioxide into the solution and to convert the absorbed sulfur dioxide to an acidic alkali sulfite, adding calcium carbonate for the double decomposition of acidic alkali sulfite into the thus obtained aqueous solution containing the acidic sulfite and after removing the precipitated calcium sulfite and accompanying calcium sulfate by filtration, circulating the filtrate as aqueous solution for absorption of sulfur dioxide in the above-mentioned exhaust gas, the method being characterized in that the double decomposition is carried out in two stages by adding calcium carbonate of different particle size, respectively and the filtration is carried out, preferably, in an atmosphere of carbon dioxide to prevent the oxidation of sulfite by oxygen in air.

1 Claim, 1 Drawing Figure

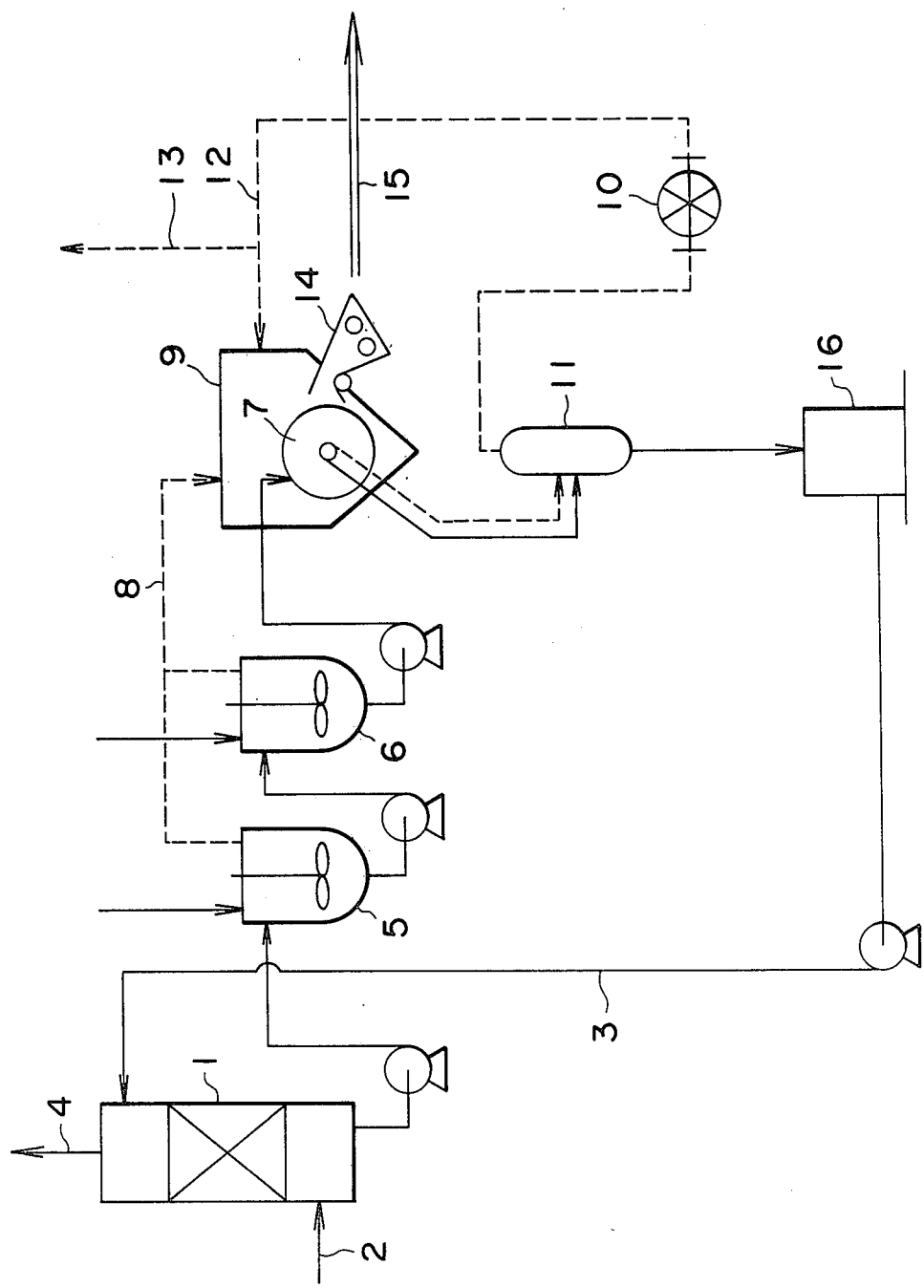

PROCESS FOR REMOVING SULFUR DIOXIDE FROM AN EXHAUST GAS CONTAINING THE SAME

BACKGROUND OF THE INVENTION

The present invention concerns a method of preventing the accumulation of an alkali sulfate which is formed as a by-product in the system in which a method for removal of sulfur dioxide from an exhaust gas of combustion is executed, by which method sulfur dioxide in the exhaust gas is absorbed in an aqueous solution containing an alkali sulfite, and the thus formed acidic alkali sulfite in solution is brought into reaction with calcium carbonate to regenerate the alkali sulfite and to form calcium sulfite; then the calcium sulfite is filtered off, to be removed from the system.

Recently, as a method of removing sulfur dioxide from an exhaust gas containing sulfur dioxide such as exhaust gases of combustion, a method has been brought into operation, in which an aqueous solution containing an alkali sulfite such as sodium sulfite as a main component is utilized as a solution for absorption of sulfur dioxide and then calcium carbonate is added to an aqueous solution containing acidic alkali sulfite formed from the absorbed sulfur dioxide in order to convert the acidic alkali sulfite into calcium sulfite and to remove the absorbed sulfur dioxide in the form of calcium sulfite from the whole system.

Aqueous solution containing an alkali sulfite utilized in the above-mentioned method for removing sulfur dioxide is excellent in the capability to absorb sulfur dioxide and it does not cause the scaling nor clogging in the gas-scrubber in which an exhaust gas is made to contact with the above-mentioned aqueous solution so that the above-mentioned method for removing sulfur dioxide is advantageous for stable operation.

However, because of the conversion of alkali sulfite to alkali sulfate, having no ability to absorb sulfur dioxide, due to gradual oxidation in the step of contact of the aqueous solution of alkali sulfite with the exhaust gas oxygen, the ability of the aqueous alkali sulfite solution as an absorbing solution for sulfur dioxide becomes impaired in the case where absorption of sulfur dioxide is carried out successively.

Hitherto, as a countermeasure of the above-mentioned problem, the following method has been adopted in which (i) a part of the above-mentioned solution for absorption is discharged to the outside of the whole system and alkali sulfite or alkali hydroxide is newly replenished, or (ii) calcium sulfite and sulfuric acid are added to the above-mentioned solution for absorption to form alkali sulfate in the solution and then the sulfate is discharged from the system to the outside in the form of gypsum, the above-mentioned reaction being as follows:

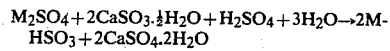

M denotes an atom of alkaline metal, also hereinafter.

Moreover, as a method for removing the above-mentioned alkali sulfate, (iii) a method is considered in which alkali sulfate is converted into alkali hydroxide by utilizing electrolysis, or (iv) another method is considered in which calcium hydroxide is added to the above-mentioned solution for absorption to convert alkali sulfate into alkali hydroxide and gypsum according to the following reaction (2):

However, these methods have their respective disadvantages, that is, the method (i) causes the loss of an effective and expensive alkali source; the method (ii) requires sulfuric acid as a new raw material which is not only expensive but also dangerous in handling; the method (iii) which utilizes electrolysis is susceptible to minute amounts of impurities, necessitating pre-treatment and moreover, in the method (iv), because of the equilibrial nature of the reaction (2) and of the slight solubility of calcium hydroxide, the concentration of regenerable alkali hydroxide is as low as 0.05 mole/liter. Thus, these methods are not satisfactory.

The inventors, as a result of studying the methods of discharging the alkali sulfate formed as a by-product from the whole system have found that in a double decomposition in which acidic alkali sulfite formed from the absorbed sulfur dioxide is converted into calcium sulfite, when granular particles of calcium carbonate of a specified (predetermined) diameter are brought into reaction in two stages with acidic alkali sulfite, gypsum co-separates out with calcium sulfite. In addition, the inventors have found that the above-mentioned alkali sulfate is formed not only in the step of contact of the exhaust gas with the absorbing solution but also is formed in an appreciable amount in the step of filtration of calcium sulfite which is obtained by the conversion of absorbed sulfur dioxide and is removed after filtration.

Moreover, in cases where a vacuum filter is used for filtering calcium sulfite, because of the vigorous gas-liquid mixing given to the filtrate within the filter and the piping from the filter to the gas-liquid separating vessel, the amount of alkali sulfate formed in the step of filtration becomes very large and reach at least more than 10% and up to 50% by weight of the total amount of formation in the whole system.

It is known that carbon dioxide evolves in the step of converting sulfur dioxide absorbed in an aqueous alkali sulfite solution which contains acidic alkali sulfite after absorbing sulfur dioxide into calcium sulfite by the addition of calcium carbonate. It was found by the inventors that when the above-mentioned calcium sulfite is filtered in an atmosphere of the carbon dioxide, the formation of alkali sulfate in the step of filtration is effectively prevented.

Accordingly, the object of the present invention is to furnish a method for preventing the accumulation of alkali sulfate which is produced as a by-product in a system of removing sulfur dioxide in an exhaust gas in the form of calcium sulfite, in which system sulfur dioxide is absorbed by an aqueous alkali sulfite solution as acidic alkali sulfite and calcium carbonate is added to the solution in order to convert the acidic alkali sulfite into calcium sulfite and then calcium sulfite is separated and removed to outside of the system.

BRIEF EXPLANATION OF DRAWING

FIGURE is an explanatory figure illustrating the steps of the method of the present invention.

DETAILED DESCRIPTION OF THE INVENTION

The present invention concerns an improvement in the method of removing sulfur dioxide from an exhaust gas containing sulfur dioxide in which method, after an exhaust gas containing sulfur dioxide is brought into contact with an aqueous solution containing alkali sulfite to absorb sulfur dioxide in the aqueous soultion as an acidic alkali sulfite, calcium carbonate is added to the aqueous solution containing the acidic alkali sulfite to form calcium sulfite by double decomposition, which is in turn separated by filtration and discharged to outside of the system, the filtrate being circulated for absorbing sulfur dioxide, characterized in that the accumulation of alkali sulfate formed in the step of absorbing sulfur dioxide and in the step of separation of calcium sulfite by the oxidation of a part of alkali sulfite is effectively prevented.

The above-mentioned prevention of accumulation of alkali sulfate in the system is carried out by the following steps.

The above-mentioned double decomposition of acidic alkali sulfite by calcium carbonate is performed in two stages such that in the first stage, relatively coarse particles of calcium carbonate with a diameter of 60 to 300 micron are added in an amount corresponding to 20 to 60% by weight of acidic alkali sulfite in the effluent from the absorbing tower to react at a pH of lower than 6.8, preferably lower than 6.7 to form and separate out calcium sulfite along with calcium sulfate (gypsum), and in the second stage, finer particles of calcium carbonate are added to the above-mentioned reaction mixture in an amount to correspond to the remaining amount of acidic alkali sulfite in the reaction mixture to complete the double decomposition to form and separate out calcium sulfite along with calcium sulfate and then the separated calcium sulfite and calcium sulfate are removed by filtration, the filtrate being circulated to the step of absorption of sulfur dioxide.

In the method of the present invention, the solid material formed by the above-mentioned double decomposition is filtered, preferably, in an atmosphere of carbon dioxide generated in the step of double decomposition for the purpose of excluding oxygen which oxidizes a part of alkali sulfite to form alkali sulfate.

That is, in the case where the oxygen content of the exhaust gas is small, the above-mentioned method of two stage reaction of the double decomposition alone is satisfactorily able to prevent the accumulation of alkali sulfate in the absorbing solution. However, in the case where the oxygen content of the exhaust gas is more than 4% by volume, especially in the case of an exhaust gas from a coal boiler containing more than 5% by volume of oxygen, the amount of formation of alkali sulfate is so great than even the above-mentioned method of double decomposition is not able to remove the alkali sulfate satisfactorily. For that purpose, by carrying out the filtration, in which step the amount of formation of alkali sulfate is next to that in the step of absorption, in an atmosphere of carbon dioxide the formation of alkali sulfate in this step is effectively prevented resulting in the suppression of the amount of alkali sulfate formation in the total system.

The present invention had made it possible to prevent the accumulation of alkali sulfate in the absorbing solution even when the exhaust gas contains much oxygen by combining the thus devised double decomposition and the thus devised process of filtration without providing any special step for removing the alkali sulfate as in the conventional process.

The following gives the explanation in more detail:

Generally, it has been considered that in cases where gypsum co-exists in a system containing a water-soluble alkali sulfite, according to the following reaction (3), calcium sulfite which is less soluble than gypsum separates out and gypsum cannot exist stably and so the alkali sulfate in the above-mentioned system of double decomposition cannot be removed from the system as gypsum:

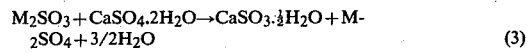

$$M_2SO_3 + CaSO_4 \cdot 2H_2O \rightarrow CaSO_3 \cdot \tfrac{1}{2}H_2O + M_2SO_4 + 3/2H_2O \qquad (3)$$

However, the solid formd by the double decomposition according to the present invention contains a considerable amount of gypsum together with calcium sulfite, unreacted calcium carbonate and impurities within calcium carbonate, etc. The gypsum is considered to be in a specific state in which gypsum is covered not to be brought into the reaction (3) with alkali sulfite, for instance, in the state of covered with crystals of being calcium sulfite. Also, it is considered that a reason why such a large amount of gypsum separates out is the formation of an unstable and soluble calcium salt, presumably an acidic calcium carbonate, on the surface of calcium carbonate, and the reaction of this unstable and soluble salt not only with alkali sulfite but also with alkali sulfate.

In order to have a larger amount of gypsum which separates together with calcium sulfite in the above-mentioned reaction of double decomposition, it is necessary to use coarser particles of calcium carbonate having an average diameter of 60 to 300 micron, preferably 70 to 150 micron, at a PH of lower than 6.8, preferably lower than 6.7.

Although the pH of the system of the above-mentioned double decomposition becomes higher as the reaction proceeds, the amount of separation of gypsum is larger when the pH is lower and smaller when the pH is higher. Accordingly, in the present invention, at first calcium carbonate is added in an amount to make 20 to 60% by weight of the acidic alkali sulfite react at a pH lower than 6.8 and then calcium carbonate is further added in an amount which is sufficient to doubly decompose the remaining amount of acidic alkali sulfite, the size of calcium carbonate particles used in the second step being preferably smaller than that of calcium carbonate used in the first step.

In the above-mentioned first step of double decomposition, the amount of separated gypsum is made larger by the use of relatively coarse particles of calcium carbonate with an average diameter of 60 to 300 micron. This fact is presumably attributed to the phenomenon that because of the high concentration of acidic alkali sulfite in the aqueous solution which has absorbed sulfur dioxide in the first step, the reaction between the coarse particles of calcium carbonate and the acidic alkali sulfite becomes slower and the concentration of the above-mentioned unstable and soluble acidic calcium carbonate is raised, and as the result, the amount of separation of gypsum is raised.

However, when coarser particles of calcium carbonate of an average diameter of larger than 300 micron are used, its reactivity with the acidic alkali sulfite becomes too low, and on the other hand, when finer particles of calcium carbonate of an average diameter of smaller than 60 micron are used the amount of formation of gypsum is greatly reduced, that is, the particles larger or smaller than those mentioned above are not preferable.

Hitherto, in the double decomposition of the acidic alkali sulfite, according to the consideration of the reactivity to the acidic alkali sulfite and the utilizability of calcium carbonate, finer particles of calcium carbonate having an average diameter smaller than 40 micron have been utilized, and in these cases the amount of gypsum separating together with calcium sulfite has been only slight, and so the method was not effective in preventing the accumulation of alkali sulfate which is formed as a by-product.

In addition, from the consideration of its reactivity and utilizability, particles of finer size of calcium carbonate less than 30 micron in diameter are used in the second stage of the double decomposition to complete the reaction.

By carrying out the double decomposition in two stages, that is relatively coarse particles of calcium carbonate being used in the first stage at a lower pH to react such particles of calcium carbonate with acidic alkali sulfite and then in the second stage, finer particles of calcium carbonate being used to cause the reaction of double decomposition to be completed, we have succeeded in making the amount of unreacted calcium carbonate smaller while making the separated amount of calcium sulfate (gypsum) larger. By doing so, it is possible to remove at least all the amount of alkali sulfate in the step of absorbing sulfur dioxide from the exhaust gas containing the same.

On the contrary, in the case where the double decomposition is carried out in one stage, the use of coarser particles of calcium carbonate, as is seen in the Comparative Example described later, results in a greater amount of unreacted calcium carbonate left in the separated solid with poor utilizability, and the use of finer particles of calcium carbonate results in a smaller amount of calcium sulfate (gypsum) which separates out, and further, the use of a mixture of coarser and finer particles of calcium carbonate makes the finer particles to react faster to raise the pH of the reactant, rapidly resulting in insufficient separation of gypsum.

The filtration of the solid matter which separated in the double decomposition and is composed mainly of calcium sulfite may be carried out in a usual manner, however, in order to suppress the formation of alkali sulfate and to prevent its accumulation throughout the system, the filtration is preferably carried out in an atmosphere of carbon dioxide.

For the better understanding of the step of filtration of calcium sulfite, mentioned above, according to the present invention, an explanation of the total system of removing sulfur dioxide from an exhaust gas is now given while referrring to the FIGURE as follows:

The exhaust gas containing sulfur dioxide is introduced into an absorbing tower 1 via a pipe 2, and after having been brought into contact with an aqueous solution containing alkali sulfite charged into the tower 1 via a pipe 3, the gas is discharged from the top part of the tower 1 via a pipe 4.

On the other hand, the effluent containing acidic alkali sulfite from the bottom part of the tower 1 is sent to the first double decomposition vessel 5 and therein the acidic alkali sulfite in the effluent is brought into reaction with coarse particles of calcium carbonate to give rise to calcium sulfite and at the same time calcium sulfate and carbon dioxide. The slurry containing the thus formed calcium sulfite and calcium sulfate is further sent to the second double decomposition vessel 6 to be further reacted with thereby added finer particles of calcium carbonate to finish the reaction. The slurry containing the reaction mixture is sent to the vacuum filter 7 and filtered, preferably in an atmosphere of carbon dioxide which is generated in the vessels 5 and 6 and delivered by a pipe 8 into the covering 9 covering the vacuum filter 7 gas-tight from outside when the vacuum pump 10 is in operation. As the carbon dioxide which generates in the vessels 5 and 6 only contains water vapour without containing oxygen, oxidation of alkali sulfite in the reaction mixture, that is, the formation of alkali sulfate in the steps of delivery and filtration is effectively preventable even if there is a vigorous contact between the carbon dioxide and the liquid of the slurry in the step of filtration. There is a circulation of carbon dioxide from the gas-liquid separator 11 to the covering 9 via the vacuum pump 10 via a pipe 12, the excess carbon dioxide being discharged from a pipe 13. Solid matter comprising calcium sulfite and calcium sulfate from the filter 7 is discharged from a port 14 and taken out by a shoot 15, and the filtrate is circulated to the absorbing tower 1 via the gas-liquid separator 11 and a receiver 16.

As has been described, in the case where sulfur dioxide in an exhaust gas is absorbed in an aqueous alkali sulfite solution and calcium carbonate is brought into reaction with the acidic alkali sulfite formed in the aqueous solution which has absorbed sulfur dioxide, according to the present invention, the accumulation of alkali sulfate in the system for removal of sulfur dioxide from the exhaust gas is extremely effectively preventable by carrying out the above-mentioned reaction in two steps using particles of calcium carbonate of specified sizes and by carrying out the filtration of calcium sulfite formed by the above-mentioned reaction in an atmosphere of carbon dioxide which generates by the above-mentioned reaction.

The following is a concrete explanation of the present invention referring to the annexed drawings by showing examples, wherein % means % by weight unless specified:

EXAMPLE 1

In a system illustrated in FIGURE, an exhaust gas of combustion containing 3,000 ppm of sulfur dioxide ($SO_2$) and 3.6% by volume of oxygen ($O_2$) was introduced into an absorbing tower 1 (5 m in height) via a pipe 2 at a rate of 5,000 $Nm^3$/hour. An aqueous solution containing 0.3% of sodium hydrogen sulfite ($NaHSO_3$), 9.3% of sodium sulfite ($Na_2SO_3$) and 9.3% of sodium sulfate ($Na_2SO_4$) was supplied to the absorbing tower 1 via a pipe 3 at a rate of 2,300 kg/hour to absorb the $SO_2$ in the exhaust gas. As a result of absorption of $SO_2$, the content of $SO_2$ in the treated exhaust gas discharged from the absorbing tower 1 through a pipe 4 was 150 ppm. Also, an aqueous solution containing 6% of $NaHSO_3$, 6% of $Na_2SO_3$ and 10% of $Na_2SO_4$ at a pH of about 6.0 was removed from the absorbing tower to a first double decomposition vessel 5 at a rate of 2,180 kg/hour. In the absorbing tower 1, a part of the sulfites was oxidized and about 4 kg/hour of $Na_2SO_4$ were formed. Pulverized lime stone with an average diameter of 150 micron was thrown into the first double decomposition vessel 5 warmed to a temperature of 80° to 90° C. at a rate of 29 kg/hour corresponding to about 46% of $NaHSO_3$ to be brought into reaction at a pH lower than 6.55.

The reaction mixture in a state of slurry was removed to a second double decomposition vessel 6. In this case, the composition of solid matter collected in a pipe connecting the two vessels was 74.7% of $CaSO_3.\frac{1}{2}H_2O$, 21.9% of $CaSO_4.2H_2O$ and 1.5% of $CaCO_3$, showing the information of 8.6 kg/hour of gypsum. Into the second double decomposition vessel 6 also warmed to a temperature of 80° to 90° C., pulverized lime stone with an average diameter of 40 micron was introduced at a rate of about 35 kg/hour corresponding to remaining 54% of $NaSHO_3$. The resultant slurry was filtered by a vacuum filter 7 to remove the solid matter which was discharged by a shoot 15 after water-washing. The composition of the thus separated solid matter was 83.7% of $CaSO_3.\frac{1}{2}H_2O$, 11.6% of $CaSO_4.2H_2O$ and 3.1% of $CaCO_3$. The amount of the solid matter was about 84 kg/hour. That is to say, the total formation of gypsum in the first and the second double decomposition vessels was about 9.7 kg/hour corresponding to about 8 kg/hour of the decrease of $NaSO_4$.

EXAMPLE 2

Into a similar absorbing tower as in Example 1, an exhaust gas of combustion containing 900 ppm of sulfur dioxide ($SO_2$) and 3.6% of oxygen was introduced at a rate of 5,000 $Nm^3$/hour. An aqueous solution containing 0.1% of $NaHSO_3$, 9.3% of $Na_2SO_3$ and 8.9% of $Na_2SO_4$ was supplied into the absorbing tower from a pipe 3 at a rate of 680 kg/hour to absorb $SO_2$ in the gas. The concentration of $SO_2$ in the treated exhaust gas at the outlet 4 was about 20 ppm. From the bottom part of the absorbing tower, an aqueous solution containing each 6% of $NAHSO_3$ and $Na_2SO_3$ and 10% of $Na_2SO_4$ at a pH of about 6 was discharged at a rate of 632 kg/hour and it was removed to the first double decomposition vessel 5. A part of the sulfites was oxidized to form about 2 kg/hour of $Na_2SO_4$. Pulverized lime stone having an average diameter of 70 micron was thrown into the first double decomposition vessel 5 at a rate of 11 kg/hour corresponding to 60% of the $NaHSO_3$ in the aqueous solution supplied to the vessel 5 to bring into reaction at a pH lower than 6.66. The reaction mixture in a state of slurry was removed from the vessel 5 to the second double decomposition vessel 6. The composition of the solid matter in the slurry was 71.0% of $CaSO_3.\frac{1}{2}H_2O$, 21% of $CaSO_4.2H_2O$ and 6.8% of $CaCO_3$ corresponding to the formation of about 3.1 kg/hour of gypsum.

Into the second double decomposition vessel 6, pulverized lime stone having an average diameter of 40 micron was supplied at a rate of about 8.3 kg/hour corresponding to the remaining amount (40%) of $NaHSO_3$ in the slurry. The slurry discharged from the vessel 6 was separated into 25.6 kg/hour of a solid matter containing 80.9% of $CaSO_3.\frac{1}{2}H_2O$, 13.3% of $CaSO_4.2H_2O$ and 4.7% of $CaCO_3$ and about 680 kg/hour of a filtrate by the separator 7 and the filtrate was circulated into the absorbing tower. In total, 3.4 kg/hour of gypsum were separated in the system, corresponding to about 2.8 kg/hour of $Na_2SO_4$.

EXAMPLE 3

An exhaust gas containing 3,000 ppm of sulfur dioxide and 5% by volume of oxygen was introduced into the absorbing tower in Example 1 at a rate of 5,000 $Nm^3$/hour. An aqueous solution containing 0.3% by weight of $NaHSO_3$, 9.3% by weight of $Na_2SO_3$ and 9.3% by weight of $Na_2SO_4$ was supplied into the absorbing tower at a rate of 2,300 kg/hour to absorb sulfur dioxide in the exhaust gas.

The content of sulfur dioxide in the thus treated exhaust gas at the outlet 4 of the absorbing tower was about 150 ppm.

From the absorbing tower, an aqueous soulution containing 6.4% by weight of $NaHSO_3$, 5.9% by weight of $Na_2SO_3$ and 10.1% by weight of $Na_2SO_4$ at a pH of about 5.9 was drawn out at a rate of 2,180 kg/hour and transferred to the first double decomposition vessel 5. Meanwhile, a part of sulfite in the solution was oxidized in the absorbing tower to form $Na_2SO_4$ at a rate of about 6 kg/hour.

At the first double decomposition vessel 5 which was warmed in advance to a temperature of 50° to 70° C., particles of calcium carbonate with a diameter of 150 micron were thrown into the above mentioned solution at a rate of 27 kg/hour corresponding to about 40% by weight of acidic sodium sulfite at a pH of lower than 6.5. The composition of the solid matter of the thus formed slurry was 69.2% by weight of $CaSO_3.\frac{1}{2}H_2O$, 24.2% by weight of $CaSO_4.2H_2O$ and 5.2% by weight of $CaCO_3$ which corresponded to the formation of about 8.8 kg/hour of calcium sulfate (gypsum). At the second double decomposition vessel 6, which received the slurry from the first double decomposition vessel 5 and warmed to a temperature of 80° to 90° C., particles of calcium carbonate with a diameter of 30 micron were thrown into the slurry at a rate of 41 kg/hour corresponding to a slight excess of remaining acidic sodium sulfite (60% by weight of the total amount). After the reaction was over, the slurry was filtered by the vacuum filter 7 to separate solid matter which was washed with water to be discharged from the port 14 and the filtrate which was returned to the absorbing tower via a pipe 3. The composition of the solid matter was 83.9% by weight of $CaSO_3.\frac{1}{2}H_2O$, 11.1% by weight of $CaSO_4.2H_2O$ and 3.5% by weight of $CaCO_3$, and the amount of the solid matter was about 89 kg/hour.

The result shows that formation of calcium sulfate (gypsum) in the first and the second reaction vessels was about 9.9 kg/hour corresponding to the reduction of about 8.2 kg/hour of sodium sulfate, $Na_2SO_4$, from the absorbing solution. There was another formation of sodium sulfate, $Na_2SO_4$, in the system except the absorbing tower, and especially a formation of about 2.6 kg/hour of $Na_2SO_4$ was observed in the vacuum filter 10. When this amount is added to the amount of formation of 6 kg/hour of $Na_2SO_4$ in the absorption tower, the sum attains 8.6 kg/hour which is larger than the amount removed by the above-mentioned double decomposition of 8.2 kg/hour.

Then, in the second run of removal of sulfur dioxide from the same exhaust gas carried out under the conditions as identical as possible to those of the first run except the step of filtration, about 11 kg/hour of carbon dioxide which generated in the first reaction vessel and about 17 kg/hour of the same which generated in the second reaction vessel were assembled and introduced into the vacuum filter to intercept the contact of air to sulfite. As a result, the formation of sodium sulfate in the step of filtration was substantially prevented. Accordingly, the concentration of sodium sulfate in the absorbing solution could be maintained at a constant value without providing any step of conversion of sodium sulfate or without drawing a part of sodium salt out of the system.

COMPARATIVE EXAMPLE

A similar run was carried out as in Example 1 except that the supply of lime stone was carried out in one step and carbon dioxide was not supplied to the step of filtration of the slurry containing calcium sulfite. On supplying about 64 kg/hour of pulverized lime stone having an average particle size of 150 micron only into the first double decomposition vessel 5 (at a time), the composition of the solid matter separated by the vacuum filter 7 was 64.4% of $CaSO_3 \cdot \frac{1}{2}H_2O$, 13.1% of $CaSO_4 \cdot 2H_2O$ and 20.1% of $CaCO_3$ rich in remaining $CaCO_3$, and the filtrate contained 1.4% of $NaHSO_3$, 8.6% of $Na_2SO_3$ and 9.1% of $Na_2SO_4$ and so it was improper to be used for the absorption of $SO_2$.

In another run similarly carried out as above, on supplying pulverized lime stone having an average diameter of 40 micron in an amount of about 64 kg/hour corresponding to the equivalent of $NaHSO_3$ at a time only into the first double decomposition vessel 5, the composition of the solid matter separated by the vacuum filter 7 was 92.3% of $CaSO_3 \cdot \frac{1}{2}H_2O$, 2.5% of $CaSO_4 \cdot 2H_2O$ and 2.8% of $CaCO_3$ and the filtrate contained 0.1% of $NaHSO_3$, 9.1% of $Na_2SO_3$ and 9.4% of $Na_2SO_4$. These figures were all desirable, however, the separated amount of gypsum was 2.1 kg/hour corresponding to only about 1.7 kg/hour of $Na_2SO_4$. This actual capacity was far short for treating the total amount of 6 to 7 kg/hour of $Na_2SO_4$ formed in the total system and it was impossible to maintain the concentration of $Na_2SO_4$ in the solution unless providing a step of conversion of $Na_2SO_4$.

What is claimed is:

1. In a process for removing sulfur dioxide from an exhaust gas containing the same, wherein said exhaust gas is brought into contact with an aqueous solution containing alkali sulfite to absorb said sulfur dioxide in said exhaust gas, and wherein, after taking up said sulfur dioxide as an acidic alkali sulfite in said aqueous solution to bring said acidic alkali sulfite into reaction with calcium carbonate and wherein the thus formed calcium sulfite is removed by filtration and discharged while the filtrate is circulated to be used in a step of absorption of said sulfur dioxide, the improvement comprising carrying out said reaction between said acidic alkali sulfite and calcium carbonate in a sequence of steps consisting of (1) a first step in which particles of calcium carbonate having an average diameter of 60 to 300 micron are added to said aqueous solution containing said acidic alkali sulfite, in an amount corresponding to 20 to 60% by weight of the total amount of said acidic alkali sulfite to produce a reaction at a pH of lower than 6.8, (2) a second step in which particles of calcium carbonate having an average diameter smaller than 40 micron are added to the effluent from said first step to bring into reaction said calcium with the remaining acidic alkali sulfite in said effluent, to have gypsum separated out together with calcium sulfite and, (3) a third step of filtering said separated gypsum and alkali sulfite in an atmosphere of carbon dioxide generated in said reaction between said acidic alkali sulfite and calcium carbonate and removing the same from the process system so as to prevent the accumulation of sulfate in said process.

* * * * *